United States Patent
Ha et al.

(10) Patent No.: US 11,667,773 B2
(45) Date of Patent: Jun. 6, 2023

(54) LATEX COMPOSITION FOR DIP MOLDING, METHOD OF PREPARING THE SAME, AND DIP-MOLDED ARTICLE PRODUCED USING THE SAME

(71) Applicant: LG Chem, Ltd., Seoul (KR)

(72) Inventors: Do Young Ha, Daejeon (KR); Won Sang Kwon, Daejeon (KR); Seung Uk Yeu, Daejeon (KR); Jung Su Han, Daejeon (KR)

(73) Assignee: LG Chem, Ltd.

( * ) Notice: Subject to any disclaimer, the term of this patent is extended or adjusted under 35 U.S.C. 154(b) by 133 days.

(21) Appl. No.: 17/299,597

(22) PCT Filed: Aug. 21, 2020

(86) PCT No.: PCT/KR2020/011186
§ 371 (c)(1),
(2) Date: Jun. 3, 2021

(87) PCT Pub. No.: WO2021/071086
PCT Pub. Date: Apr. 15, 2021

(65) Prior Publication Data
US 2022/0017728 A1 Jan. 20, 2022

(30) Foreign Application Priority Data

Oct. 11, 2019 (KR) .................. 10-2019-0126402

(51) Int. Cl.
| | | |
|---|---|---|
| *C08L 9/04* | (2006.01) | |
| *B29C 41/00* | (2006.01) | |
| *B29C 41/14* | (2006.01) | |
| *C08F 2/24* | (2006.01) | |
| *C08F 236/12* | (2006.01) | |
| *C08K 5/06* | (2006.01) | |
| *B29K 9/00* | (2006.01) | |

(52) U.S. Cl.
CPC .............. *C08L 9/04* (2013.01); *B29C 41/003* (2013.01); *B29C 41/14* (2013.01); *C08F 2/24* (2013.01); *C08F 236/12* (2013.01); *C08K 5/06* (2013.01); *B29K 2009/00* (2013.01)

(58) Field of Classification Search
CPC ......... C08L 9/04; B29C 41/003; B29C 41/14; B29K 2009/00; C08F 2/24; C08F 236/12; C08K 5/06

USPC ......................................................... 524/565
See application file for complete search history.

(56) References Cited

U.S. PATENT DOCUMENTS

| | | | | |
|---|---|---|---|---|
| 3,770,684 A | * | 11/1973 | Singer et al. .......... | C09D 5/024 |
| | | | | 524/265 |
| 2006/0106153 A1 | | 5/2006 | Blankenship et al. | |
| 2007/0155880 A1 | | 7/2007 | Bobsein et al. | |
| 2009/0209659 A1 | | 8/2009 | Di Cosmo et al. | |
| 2015/0225553 A1 | | 8/2015 | Yang et al. | |
| 2017/0342242 A1 | * | 11/2017 | Kato ........................ | C08K 3/06 |
| 2021/0087371 A1 | | 3/2021 | Kwon et al. | |

FOREIGN PATENT DOCUMENTS

| | | |
|---|---|---|
| CN | 1303113 C | 3/2007 |
| CN | 101003702 A | 7/2007 |
| CN | 107001716 A | 8/2017 |
| EP | 1541643 A1 | 6/2005 |
| EP | 1806386 A2 | 7/2007 |
| GB | 1356285 A | 6/1974 |
| JP | 2001123015 A | 5/2001 |
| JP | 2007182569 A | 7/2007 |
| JP | 4554767 B2 | 9/2010 |
| KR | 20040034796 A | 4/2004 |
| KR | 20100133638 A | 12/2010 |
| KR | 20120086927 A | 8/2012 |
| KR | 20160140497 A | 12/2016 |
| KR | 20180066819 A | 6/2018 |
| WO | 0000539 A1 | 1/2000 |
| WO | 2007004459 A1 | 1/2007 |
| WO | 2016104057 A1 | 6/2016 |
| WO | 2020116793 A1 | 6/2020 |

OTHER PUBLICATIONS

Basf: The Chemical Company, Technical Information: Rheovis PU 1331, Nov. 2012, 2 pages.
International Search Report for Application No. PCT/KR2020/011186, dated Nov. 26, 2020, 3 pages.
Extended European Search Report including Written Opinion for Application No. 20875294.9 dated Feb. 16, 2022, pp. 1-7.

* cited by examiner

*Primary Examiner* — Hui H Chin
(74) *Attorney, Agent, or Firm* — Lerner David LLP

(57) ABSTRACT

A latex composition for dip molding having an excellent flow mark property and syneresis property and being capable of providing a molded article having excellent tensile properties and texture is provided. A method of preparing the latex composition, and a dip-molded article produced using the latex composition are also provided.

14 Claims, No Drawings

LATEX COMPOSITION FOR DIP MOLDING, METHOD OF PREPARING THE SAME, AND DIP-MOLDED ARTICLE PRODUCED USING THE SAME

CROSS-REFERENCE TO RELATED APPLICATIONS

The present application is a national stage entry under 35 U.S.C. § 371 of International Application No. PCT/KR2020/011186 filed on Aug. 21, 2020, which claims priority to Korean Patent Application No. 10-2019-0126402, filed on Oct. 11, 2019, the entire contents of which are incorporated herein by reference.

TECHNICAL FIELD

The present invention relates to a latex composition for dip molding having an excellent flow mark property and syneresis property and being capable of providing a molded article having excellent tensile properties, a method of preparing the same, and a dip-molded article produced using the same.

BACKGROUND ART

In accordance with a significant increase in environment and safety concerns in daily life such as housework, as well as in various technical fields such as the food industry, the electronic industry, and medical fields, a demand for a glove for protecting a hand has been increased, and the market of rubber gloves has also been significantly increased.

In an increasingly competitive rubber glove market, a demand for a differentiated product emphasizing specificity has been increased to respond to the diversification of the use of gloves and the strengthened eco-friendly regulations, rather than an inexpensive general-purpose product.

However, the use of the existing natural rubber (NR) glove is limited to medical use, and it is known that a protein or the like included in a natural rubber of the natural rubber glove includes allergens. Therefore, a demand for a nitrile glove which may implement qualities for various purposes in comparison with the natural rubber and does not include allergens has been increased.

Since the nitrile glove may implement various qualities in comparison with the natural rubber glove, the use of the glove may be subdivided into a thin glove, an industrial glove, an eco-friendly glove, in addition to a soft medical glove replacing the natural rubber glove.

However, a latex for a glove having excellent physical properties such as strength and chemical resistance has been developed to respond to the diversification of the use of gloves, but since the excellent physical properties and production workability of the glove have a trade-off relationship, the workability is poor due to deterioration of the flow mark property and syneresis property when producing a glove, resulting in a reduction in productivity of manufacturers.

Therefore, there is a need to develop a technique that may satisfy all of workability of a latex composition when producing a glove and physical properties of the produced glove using the same.

DISCLOSURE

Technical Problem

In order to solve the problems mentioned in the background art, an object of the present invention is to improve workability of a latex composition having an excellent flow mark property and syneresis property when dip-molded, and to improve physical properties such as tensile properties of a dip-molded article such as a glove produced using the same.

That is, the present invention is devised to solve the problems mentioned in the background art, and an object of the present invention is to provide a latex composition for dip molding including a carboxylic acid-modified nitrile-based copolymer latex which may have improved workability due to its excellent flow mark property and syneresis property in accordance with inclusion of a hydrophobically modified ethoxylated emulsion thickener and may improve tensile properties of a dip-molded article produced using the same, a method of preparing the same, and a dip-molded article produced using the same.

Technical Solution

In one general aspect, a latex composition for dip molding includes a carboxylic acid-modified nitrile-based copolymer latex and a thickener, wherein the thickener has an associative part and a non-associative part, the associative part has one or more hydrophobic groups selected from the group consisting of an alkyl group, aryl group, and arylalkyl group having 6 to 13 carbon atoms, and the non-associative part has a linear ether group having 1,000 or fewer carbon atoms.

In another general aspect, a method of preparing a latex composition for dip molding includes mixing a carboxylic acid-modified nitrile-based copolymer latex and a thickener with each other, wherein the thickener has an associative part and a non-associative part, the associative part has one or more hydrophobic groups selected from the group consisting of an alkyl group, aryl group, and arylalkyl group having 6 to 13 carbon atoms, and the non-associative part has a linear ether group having 1,000 or fewer carbon atoms.

In still another general aspect, a dip-molded article is produced using the latex composition for dip molding.

Advantageous Effects

The latex composition for dip molding according to the present invention includes the carboxylic acid-modified nitrile-based copolymer latex and an ethoxylated emulsion thickener modified with a hydrophobic group, such that the flow mark property and the syneresis property are excellent, and the tensile properties of the dip-molded article produced by using the latex composition for dip molding are thus excellent.

BEST MODE

The terms and words used in the description and claims of the present invention are not to be construed as general or dictionary meanings but are to be construed as meanings and concepts meeting the technical ideas of the present invention based on a principle that the inventors can appropriately define the concepts of terms in order to describe their own inventions in the best mode.

Hereinafter, the present invention will be described in more detail in order to assist in the understanding of the present invention.

The term "repeating unit derived from a monomer" in the present invention may refer to a component or structure derived from a monomer or a material itself, and may refer to a repeating unit formed in a polymer by an added monomer participating in a polymerization reaction during polymerization of the polymer.

The term "latex" in the present invention may refer to that a polymer or a copolymer polymerized by polymerization is present in a form dispersed in water. As a specific example, the term "latex" may refer to that fine particles of a rubber-like polymer or fine particles of a rubber-like copolymer polymerized by emulsion polymerization are present in a colloidal state in which the fine particles are dispersed in water.

The term "hydrophobically modified ethoxylated emulsion thickener" in the present invention may refer to a water-soluble or water-dispersible polymer compound having a hydrophobic group. As a specific example, the term "hydrophobically modified ethoxylated emulsion thickener" may refer to a copolymer produced by synthesis between a compound called "non-associative" having a linear ether group, and a monomer or condensate called "associative" having an alkyl group, an aryl group, or an arylalkyl group, and may exert a thickening effect through a coagulation reaction between a specific hydrophobic part in the hydrophobically modified ethoxylated emulsion thickener itself and another hydrophobic substance in an aqueous system.

The term "layer derived" in the present invention may refer to a layer formed from a polymer or a copolymer. As a specific example, the term "layer derived" may refer to a layer formed from a polymer or a copolymer by attaching, fixing, and/or polymerizing the polymer or the copolymer in a latex composition for dip molding on a dip molding mold when producing a dip-molded article.

The present invention provides a latex composition for dip molding having an excellent flow mark property and syneresis property and being capable of improving tensile properties of a dip-molded article produced using the same.

The latex composition for dip molding according to an exemplary embodiment of the present invention includes a carboxylic acid-modified nitrile-based copolymer latex and a thickener. The thickener has an associative part and a non-associative part, the associative part has one or more hydrophobic groups selected from the group consisting of an alkyl group, aryl group, and arylalkyl group having 6 to 13 carbon atoms, and the non-associative part has a linear ether group having 1,000 or fewer carbon atoms.

The latex composition for dip molding including the carboxylic acid-modified nitrile-based copolymer latex is used as a raw material in the rubber glove industry that has solved an allergy occurrence and usage limitation of an existing natural rubber glove, and has been applied in various fields such as thin glove fields, industrial fields, and eco-friendly fields, in addition to a soft medical glove. However, the latex composition for dip molding is required to have excellent strength, chemical resistance, and the like to be applied in the various fields, but since the excellent physical properties and production workability have a trade-off relationship, the workability is poor due to deterioration of the flow mark property and syneresis property when producing a glove, resulting in a reduction in productivity of manufacturers. On the other hand, the latex composition for dip molding according to an exemplary embodiment of the present invention includes a thickener having a hydrophobic group having 6 to 13 carbon atoms and a linear ether group, that is, an associative part and a non-associative part, such that the flow mark property and the syneresis property are improved, thereby implementing an excellent workability and obtaining a dip-molded article produced using the same, such as a glove, which has excellent physical properties such as tensile properties and texture.

In an exemplary embodiment of the present invention, the thickener has an associative part and a non-associative part. Specifically, the thickener may have an associative part and a non-associative part, the associative part may have one or more hydrophobic groups selected from the group consisting of an alkyl group, aryl group, and arylalkyl group having 6 to 13 carbon atoms, and the non-associative part may have a linear ether group having 1,000 or fewer carbon atoms.

In the latex composition for dip molding, the thickener is used for a thickening effect, and in this case, the thickener may be divided into a non-associative thickener and an associative thickener. The non-associative thickener, which is an alkali-soluble thickener (ASE), is swollen according to an increase of a pH in the latex composition for dip molding, a distance between the swollen non-associative thickener and polymer latex particles becomes narrow, and the latex composition for dip molding is thus thickened.

However, since a thickening phenomenon is exhibited by swelling of a non-associative thickener which is generally used, it is advantageous in terms of a low reduction of a viscosity due to an external pressure such as shear, but is disadvantageous in terms of being greatly affected by a total solid content (TSC), a pH, a temperature, and the like of a polymer latex solution to be thickened.

On the other hand, the associative thickener has a hydrophobic group at each of both terminals of a main chain, and forms a hydrophobic bond with carboxylic acid-modified nitrile-based copolymer latex particles which are hydrophobic and dispersed in an aqueous phase in a latex composition for dip molding to thicken the latex composition for dip molding. However, since the associative thickener has the hydrophobic group at each of the both terminals of the main chain, it is advantageous in terms of being hardly affected by the total solid content (TSC), the pH, the temperature, and the like, but is disadvantageous in terms of being affected by the external pressure such as shear.

On the contrary, the thickener according to an exemplary embodiment of the present invention is a hydrophobically modified ethoxylated emulsion thickener, and has a hydrophobic group at each of both terminals of a main chain and a linear ether group at the center portion thereof, such that the thickener has chemical structures similar to both the associative thickener and the non-associative thickener. Therefore, the thickener easily forms a hydrophobic bond with particles in the carboxylic acid-modified nitrile-based copolymer latex due to hardly being affected by the total solid content (TSC), the pH, the temperature, and the external pressure such as shear, and a dip-molded article having an excellent density is thus formed when producing the dip-molded article, resulting in improvement of the workability.

The thickener may have an associative part having one or more hydrophobic groups selected from the group consisting of an alkyl group, aryl group, and arylalkyl group having 6 to 13 carbon atoms and a non-associative part having a linear ether group having 1,000 or fewer carbon atoms. Specifically, the associative part and the non-associative part may be included in the thickener in amounts of 10 wt % to 25 wt % and 75 wt % to 90 wt %, respectively. Within these ranges, in the latex composition for dip molding including the thickener, the thickening effect is excellent due to a hydrophobic bond and an interaction between the thickener and a hydrophobic substance of the carboxylic acid-modified nitrile-based copolymer latex, and thus, a syneresis time improvement range is large and a flow mark property of a dip-molded article is excellent.

Specifically, the thickener may be included in the latex composition for dip molding according to the present invention in an amount of 0.01 parts by weight to 10 parts by weight or 0.03 parts by weight to 5 parts by weight based on 100 parts by weight (based on a solid content) of the carboxylic acid-modified nitrile-based copolymer latex. Within these ranges, the thickening effect may be excellent, and thus, the syneresis time improvement range may be large and the flow mark property of the dip-molded article may be excellent.

In addition, the thickener is included in the latex composition for dip molding according to an exemplary embodiment of the present invention in the amount as described above, such that the latex composition for dip molding may have a viscosity of 1,000 cPs or less, and more specifically, 100 to 1,000 cPs. Within these ranges, the latex composition for dip molding may have an excellent flow mark property and syneresis property, and tensile properties of a molded article produced using the same may be excellent.

In this case, the viscosity (cPs) is measured under conditions of spindle #63 and an rpm of 60 at room temperature (23±3° C.) using a Brookfield viscometer.

More specifically, the thickener according to an exemplary embodiment of the present invention is a compound represented by the following Formula 1.

$$R_1-O-[EO]_n-O-R_2 \quad \text{[Formula 1]}$$

in Formula 1,

EO is an ethylene oxide group, $R_1$ and $R_2$ are each independently an alkyl group, aryl group, or arylalkyl group having 6 to 13 carbon atoms, and n is an integer of 300 to 800.

Still more specifically, in Formula 1, $R_1$ and $R_2$ may be each independently an alkyl group having 6 to 13 carbon atoms, and n may be an integer of 500 to 700.

In addition, a weight average molecular weight of the thickener may be 2,000 g/mol to 1,000,000 g/mol. Within this range, when a dip-molded article is molded using the latex composition for dip molding prepared using the carboxylic acid-modified nitrile-based copolymer latex, a syneresis time improvement range is large and a flow mark property of the dip-molded article is excellent without reducing stability of the carboxylic acid-modified nitrile-based copolymer latex.

In addition, the thickener is generally in an aqueous solution state having a solid content (concentration) of 21% or less, and has a viscosity of 4,500 mPa·s or less at 23° C. Within this range, when a dip-molded article is molded using the latex composition for dip molding prepared using the carboxylic acid-modified nitrile-based copolymer latex, a syneresis time improvement range is large and a flow mark property of the dip-molded article is excellent without reducing stability of the carboxylic acid-modified nitrile-based copolymer latex due to no coagulation of the thickener.

Meanwhile, in an exemplary embodiment of the present invention, the carboxylic acid-modified nitrile-based copolymer latex may include a repeating unit derived from a conjugated diene monomer, a repeating unit derived from an ethylenically unsaturated nitrile monomer, and a repeating unit derived from an ethylenically unsaturated acid monomer.

The repeating unit derived from the conjugated diene monomer is formed by polymerization of a conjugated diene monomer, and the conjugated diene monomer may be one or more selected from the group consisting of 1,3-butadiene, 2,3-dimethyl-1,3-butadiene, 2-ethyl-1,3-butadiene, 1,3-pentadiene, and isoprene. As a specific example, the conjugated diene monomer may be 1,3-butadiene or isoprene, and as a more specific example, the conjugated diene monomer may be 1,3-butadiene.

In addition, the repeating unit derived from the conjugated diene monomer may be included in the carboxylic acid-modified nitrile-based copolymer latex in an amount of 40 wt % to 89 wt %, and specifically, 45 wt % to 80 wt % or 50 wt % to 78 wt %. Within these ranges, a dip-molded article molded from the latex composition for dip molding including the carboxylic acid-modified nitrile-based copolymer latex is flexible and has not only an excellent wearability but also an excellent oil resistance and tensile strength.

In addition, the repeating unit derived from the ethylenically unsaturated nitrile monomer is formed by polymerization of an ethylenically unsaturated nitrile monomer, and the ethylenically unsaturated nitrile monomer may be one or more selected from the group consisting of acrylonitrile, methacrylonitrile, fumaronitrile, α-chloronitrile, and α-cyanoethylacrylonitrile. As a specific example, the ethylenically unsaturated nitrile monomer may be acrylonitrile or methacrylonitrile, and as a more specific example, the ethylenically unsaturated nitrile monomer may be acrylonitrile.

Meanwhile, the repeating unit derived from the ethylenically unsaturated nitrile monomer may be included in the carboxylic acid-modified nitrile-based copolymer latex in an amount of 10 wt % to 50 wt %, and specifically, 15 wt % to 45 wt % or 20 wt % to 40 wt %. Within these ranges, a dip-molded article molded from the latex composition for dip molding including the carboxylic acid-modified nitrile-based copolymer latex is flexible and has not only an excellent wearability but also an excellent oil resistance and tensile strength.

In addition, the repeating unit derived from the ethylenically unsaturated acid monomer is formed by polymerization of an ethylenically unsaturated acid monomer, and the ethylenically unsaturated acid monomer may be an ethylenically unsaturated monomer having an acid group such as a carboxyl group, a sulfonic acid group, or an acid anhydride group. As a specific example, the ethylenically unsaturated acid monomer may be one or more selected from the group consisting of an ethylenically unsaturated acid monomer such as acrylic acid, methacrylic acid, itaconic acid, maleic acid, or fumaric acid; a polycarboxylic acid anhydride such as maleic acid anhydride or citraconic acid anhydride; an ethylenically unsaturated sulfonic acid monomer such as styrenesulfonic acid; and an ethylenically unsaturated polycarboxylic acid partial ester monomer such as monobutyl fumarate, monobutyl maleate, or mono-2-hydroxypropyl maleate. As a more specific example, the ethylenically unsaturated acid monomer may be one or more selected from the group consisting of acrylic acid, methacrylic acid, itaconic acid, maleic acid, and fumaric acid. As a still more specific example, the ethylenically unsaturated acid monomer may be methacrylic acid. The ethylenically unsaturated acid monomer may be used in a form of a salt such as an alkali metal salt or an ammonium salt during polymerization.

Meanwhile, the repeating unit derived from the ethylenically unsaturated acid monomer may be included in the carboxylic acid-modified nitrile-based copolymer latex in an amount of 0.1 wt % to 10 wt %, and specifically, 0.5 wt % to 9 wt % or 1 wt % to 8 wt %. Within these ranges, a dip-molded article molded from the latex composition for dip molding including the carboxylic acid-modified nitrile-based copolymer is flexible and has not only an excellent wearability but also an excellent tensile strength.

According to an exemplary embodiment of the present invention, the carboxylic acid-modified nitrile-based copolymer in the carboxylic acid-modified nitrile-based copolymer latex may further selectively include a repeating unit derived from an ethylenically unsaturated monomer, in addition to the repeating unit derived from the conjugated diene-based monomer, the repeating unit derived from the ethylenically unsaturated nitrile-based monomer, and the repeating unit derived from the ethylenically unsaturated acid monomer.

The ethylenically unsaturated monomer constituting the repeating unit derived from the ethylenically unsaturated monomer may be one or more selected from the group consisting of a hydroxyalkyl (meth)acrylate monomer having 1 to 4 carbon atoms; a vinyl aromatic monomer selected from the group consisting of styrene, alkylstyrene, and vinyl naphthalene; fluoroalkyl vinyl ether such as fluoro ethyl vinyl ether; an ethylenically unsaturated amide monomer selected from the group consisting of (meth)acrylamide, N-methylol (meth)acrylamide, N,N-dimethylol (meth)acrylamide, N-methoxymethyl (meth)acrylamide, and N-propoxymethyl (meth)acrylamide; a non-conjugated diene monomer such as vinyl pyridine, vinyl norbornene, dicyclopentadiene, or 1,4-hexadiene; and an ethylenically unsaturated carboxylic acid ester monomer selected from the group consisting of methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxyethyl (meth)acrylate, hydroxypropyl (meth)acrylate, glycidyl (meth)acrylate, and dimethylamino ethyl (meth)acrylate. As a more specific example, the ethylenically unsaturated monomer constituting the repeating unit derived from the ethylenically unsaturated monomer may be one or more selected from the group consisting of hydroxyalkyl (meth)acrylate monomers having 1 to 4 carbon atoms, and as a still more specific example, the ethylenically unsaturated monomer constituting the repeating unit derived from the ethylenically unsaturated monomer may be a hydroxyethyl (meth)acrylate monomer.

A content of the repeating unit derived from the ethylenically unsaturated monomer may be within 20 wt %, 0.2 wt % to 10 wt %, or 0.5 wt % to 5 wt %, with respect to a total content of the carboxylic acid-modified nitrile-based copolymer. Within these ranges, a dip-molded article molded from the latex composition for dip molding including the carboxylic acid-modified nitrile-based copolymer is flexible and has not only an excellent wearability but also an excellent tensile strength.

According to an exemplary embodiment of the present invention, a glass transition temperature of the carboxylic acid-modified nitrile-based copolymer latex may be −55° C. to −15° C., −50° C. to −15° C., or −50° C. to −20° C. Within these ranges, a molded article dip-molded from the latex composition for dip molding including the carboxylic acid-modified nitrile-based copolymer latex has an excellent wearability due to its low stickiness while preventing degradation in tensile properties such as tensile strength, and cracks. The glass transition temperature may be measured using differential scanning calorimetry.

In addition, according to an exemplary embodiment of the present invention, an average particle size of particles of the carboxylic acid-modified nitrile-based copolymer in the carboxylic acid-modified nitrile-based copolymer latex may be 90 nm to 200 nm, 95 nm to 195 nm, or 100 nm to 190 nm. Within these ranges, the carboxylic acid-modified nitrile-based copolymer latex may be prepared at a high concentration, and a molded article dip-molded from the latex composition for dip molding including the same may have excellent tensile properties such as tensile strength. The average particle size may be measured using a laser scattering analyzer (Nicomp).

In addition, according to an exemplary embodiment of the present invention, a solid content (concentration) of the latex composition for dip molding may be, for example, 8 wt % to 40 wt %, 8 wt % to 35 wt %, or 10 wt % to 35 wt %. Within these ranges, latex transport efficiency is excellent, and an increase in viscosity of the latex is prevented, such that storage stability is excellent.

As another example, a pH of the latex composition for dip molding may be 8 to 12, 9 to 11, or 9.0 to 11.5. Within these ranges, processability and productivity when producing a dip-molded article may be excellent. The pH of the latex composition for dip molding may be adjusted by addition of the pH adjuster described below. Examples of the pH adjuster may include an aqueous potassium hydroxide solution having a concentration of 1 wt % to 5 wt %, and ammonia water having a concentration of 1 wt % to 10 wt %.

In addition, according to an exemplary embodiment of the present invention, the latex composition for dip molding may further include an additive such as a vulcanizing agent, an ionic cross-linking agent, a pigment, a vulcanization accelerator, a filler, or a pH adjuster, if necessary.

The vulcanization accelerator is not particularly limited as long as it is used for dip molding, and examples thereof may include 2-mercaptobenzothiazole (MBT), 2,2-dithiobisbenzothiazole-2-sulfenamide (MBTS), N-cyclohexylbenzothiazole-2-sulfenamide (CBS), 2-morpholinothiobenzothiazole (MBS), tetramethylthiuram monosulfide (TMTM), tetraethylthiuram disulfide (TMTD), zinc diethyldithiocarbamate (ZDEC), zinc dibutyldithiocarbamate (ZDBC), diphenylguanidine (DPG), and di-o-tolylguanidine (DOTG). In this case, the vulcanization accelerators may be used alone or in combination of two or more thereof, and may be used in an amount of 0.1 parts by weight to 10 parts by weight or 0.5 parts by weight to 5 parts by weight based on a solid content of 100 parts by weight of the carboxylic acid-modified nitrile-based copolymer latex.

In addition, the present invention provides a method of preparing the latex composition for dip molding.

The preparation method according to an exemplary embodiment of the present invention may include mixing a carboxylic acid-modified nitrile-based copolymer latex and a thickener with each other, and in this case, the thickener is as described above.

Meanwhile, the carboxylic acid-modified nitrile-based copolymer latex may be prepared by emulsion-polymerizing a conjugated diene monomer, an ethylenically unsaturated nitrile monomer, and an ethylenically unsaturated acid monomer in the presence of an emulsifier. In this case, the monomers and contents of the monomers are as described above, the respective monomers may be added at the same time or separately added to a reactor before the polymerization. In a case where the monomers are separately added, a distribution of the monomers due to a reaction speed difference between the monomers may be uniform. Therefore, a balance between physical properties of a dip-molded article produced by using the carboxylic acid-modified nitrile-based copolymer may be improved.

Specifically, the carboxylic acid-modified nitrile-based copolymer latex may be prepared through emulsion polymerization in the presence of an emulsifier, a polymerization initiator, an activator, a chain transfer agent, and the like.

The emulsifier may be, for example, one or more selected from the group consisting of an anionic surfactant, a nonionic surfactant, a cationic surfactant, and an amphoteric surfactant. As a specific example, the emulsifier may be one or more anionic surfactants selected from the group consisting of alkyl benzene sulfonate, aliphatic sulfonate, higher alcohol sulfate ester, α-olefin sulfonate, and alkyl ether sulfate. In addition, the emulsifier may be added in an amount of 0.3 parts by weight to 10 parts by weight, 0.8 parts by weight to 8 parts by weight, or 1.5 parts by weight to 6 parts by weight, with respect to a total content of 100 parts by weight of the monomer. Within these ranges, the polymerization stability may be excellent, and a molded article may be easily produced due to a small amount of foam.

In addition, the polymerization initiator may be, for example, a radical initiator, and as a specific example, the polymerization initiator may be one or more selected from the group consisting of inorganic peroxide such as sodium persulfate, potassium persulfate, ammonium persulfate, potassium perphosphate, or hydrogen peroxide; organic peroxide such as t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, or t-butyl peroxy isobutylate; and a nitrogen compound such as azobisisobutyronitrile, azobis-2,4-dimethylvaleronitrile, azobiscyclohexanecarbonitrile, or methyl azobisisobutyrate. As a specific example, the polymerization initiator may be inorganic peroxide, and as a more specific example, the polymerization initiator may be persulfate. In addition, the polymerization initiator may be added in an amount of 0.01 parts by weight to 2 parts by weight, 0.01 parts by weight to 1.5 parts by weight, or 0.02 parts by weight to 1.5 parts by weight, with respect to the total content of 100 parts by weight of the monomer. Within these ranges, a polymerization speed may be maintained at an appropriate level.

In addition, the activator may be one or more selected from the group consisting of sodium formaldehyde sulfoxylate, sodium ethylenediamineteraacetate, ferrous sulfate, dextrose, sodium pyrophosphate, and sodium sulfite. In addition, the activator may be added in an amount of 0.01 parts by weight to 5 parts by weight, 0.05 parts by weight to 3 parts by weight, or 0.1 parts by weight to 1 part by weight, with respect to the total content of 100 parts by weight of the monomer. Within these ranges, a polymerization speed may be maintained at an appropriate level.

In addition, in a case where the emulsion polymerization is performed by including a chain transfer agent, the chain transfer agent may be, for example, one or two or more selected from the group consisting of mercaptans such as α-methylstyrenedimer, t-dodecyl mercaptan, n-dodecyl mercaptan, and octyl mercaptan; halogenated hydrocarbons such as carbon tetrachloride, methylene chloride, and methylene bromide; and sulfur-containing compounds such as tetraethylthiuram disulfide, dipentamethylenethiuram disulfide, and diisopropylxanthogen disulfide. As a specific example, the chain transfer agent may be mercaptans, and as a more specific example, the chain transfer agent may be t-dodecyl mercaptan. In addition, the chain transfer agent may be added in an amount of 0.1 parts by weight to 2 parts by weight, 0.2 parts by weight to 1.5 parts by weight, or 0.3 parts by weight to 1.0 part by weight, with respect to the total content of 100 parts by weight of the monomer. Within these ranges, the polymerization stability is excellent, and physical properties of a molded article when producing the molded article after the polymerization are excellent.

In addition, according to an exemplary embodiment of the present invention, the emulsion polymerization may be performed in a medium such as water, and as a specific example, deionized water. The emulsion polymerization may be performed by further including an additive such as a chelating agent, a dispersant, a pH adjuster, a deoxidizer, a particle size adjuster, an antioxidant, or an oxygen scavenger, if necessary, to ensure ease of polymerization.

According to an exemplary embodiment of the present invention, the emulsifier, the polymerization initiator, the chain transfer agent, the additive, and the like may be added at the same time or separately added to a polymerization reactor, together with the monomer, and each addition may be continuously performed.

In addition, according to an exemplary embodiment of the present invention, the emulsion polymerization may be performed at a polymerization temperature of 10° C. to 90° C., 20° C. to 80° C., or 25° C. to 75° C. Within these ranges, latex stability is excellent.

Meanwhile, according to an exemplary embodiment of the present invention, the preparation method may include terminating emulsion polymerization to obtain a carboxylic acid-modified nitrile-based copolymer latex. The termination of an emulsion polymerization reaction may be performed at the point where a polymerization conversion rate reaches 90% or more, 91% or more, or 93% or more. The termination of the emulsion polymerization reaction may be performed by addition of a polymerization terminating agent, a pH adjuster, or an antioxidant. In addition, after the emulsion polymerization termination, removing of unreacted monomers through a deodorization and concentration process may be further performed.

In addition, the present invention provides a dip-molded article produced by using the latex composition for dip molding.

The dip-molded article according to an exemplary embodiment of the present invention may include a layer derived from the latex composition for dip molding.

The molded article may be a dip-molded article produced by dip molding the latex composition for dip molding, and may be a molded article including a layer derived from the latex composition for dip molding formed from the latex composition for dip molding by dip molding. A method of producing the molded article may include dipping the latex composition for dip molding by a direct dipping method, an anode coagulation dipping method, a Teague's coagulation dipping method, or the like. As a specific example, the molded article may be produced by an anode coagulation dipping method, and in this case, a dip-molded article having a uniform thickness may be obtained.

As a specific example, the method of producing the molded article may include: a step S100 of attaching a coagulant to a dip molding mold; a step S200 of dipping the dip molding mold to which the coagulant is attached into a latex composition for dip molding to form a layer derived from the latex composition for dip molding, that is, a dip-molded layer; and a step S300 of heating the dip-molded layer to cross-link the latex composition for dip molding.

The step S100 is a step of dipping a dip molding mold into a coagulant solution to attach a coagulant to the dip molding mold so as to attach the coagulant to a surface of the dip molding mold. The coagulant solution is a solution obtained by dissolving a coagulant in water, alcohol, or a mixture thereof. A content of the coagulant in the coagulant solution may be 5 wt % to 50 wt %, 7 wt % to 45 wt %, or 10 wt % to 40 wt %, with respect to a total content of the coagulant solution. The coagulant may be, for example, one or more selected from the group consisting of metal halide such as barium chloride, calcium chloride, magnesium chloride, zinc chloride, or aluminum chloride; nitrate such as barium nitrate, calcium nitrate, or zinc nitrate; acetate such as barium acetate, calcium acetate, or zinc acetate; and sulfate such as calcium sulfate, magnesium sulfate, or aluminum sulfate. As a specific example, the coagulant may be calcium chloride or calcium nitrate.

In addition, the step S200 may be a step of dipping the dip molding mold to which the coagulant is attached into the latex composition for dip molding according to the present invention and taking out the dip molding mold to form a dip-molded layer in the dip molding mold.

In addition, the step S300 may be a step of heating the dip-molded layer formed in the dip molding mold and cross-linking and curing the latex composition for dip molding to obtain a dip-molded article.

Thereafter, the dip-molded layer cross-linked by the heating treatment may be removed from the dip molding mold to obtain a dip-molded article.

According to an exemplary embodiment of the present invention, the molded article may be a glove such as a surgical glove, an examination glove, an industrial glove, or a household glove, a condom, a catheter, or a health care product.

Hereinafter, the present invention will be described in more detail by examples. However, the following examples are provided for illustrating the present invention. It is apparent to a person skilled in the art that various modifications and alterations may be made without departing from the scope and spirit of the present invention, and the scope of the present invention is not limited thereto.

EXAMPLES

Example 1

<Preparation of Carboxylic Acid-Modified Nitrile-Based Copolymer Latex>

To a polymerization reactor, 100 parts by weight of a monomer mixture composed of 28 wt % of acrylonitrile, 63.0 wt % of 1,3-butadiene, and 5.5 wt % of methacrylic acid, 0.5 parts by weight of t-dodecyl mercaptan, 3.0 parts by weight of alkyl benzene sulfonate, and 140 parts by weight of water were added, and polymerization was initiated at a temperature of 40° C. Subsequently, a temperature was raised to 60° C. at the point where a polymerization conversion rate reached 65% and polymerization was performed, and then, the polymerization was terminated by adding 0.1 parts by weight of sodium dimethyldithiocarbamate at the point where the polymerization conversion rate reached 94%. Subsequently, a certain amount of unreacted monomers was removed through a deodorization process, and 0.5 parts by weight of ammonia water, 0.5 parts by weight of potassium hydroxide, 0.5 parts by weight of an antioxidant, and 0.3 parts by weight of a defoaming agent were added to obtain a carboxylic acid-modified nitrile-based copolymer latex having a solid content concentration of 45 wt % and a pH of 8.0.

<Preparation of Latex Composition for Dip Molding>

To 100 parts by weight (based on a solid content) of the obtained carboxylic acid-modified nitrile-based copolymer latex, 1 part by weight of a hydrophobically modified ethoxylated emulsion thickener solution being diluted with secondary distilled water at a solid content concentration of 5% and having a hydrophobic alkyl group having C6-C13 carbon atoms, 1 part by weight of sulfur, 0.7 parts by weight of zinc dibutyldithiocarbamate (ZDBC), 1.5 parts by weight of zinc oxide, 1.0 part by weight of titanium oxide, 2.0 parts by weight of a potassium hydroxide solution, and secondary distilled water were added, to obtain a latex composition for dip molding having a solid content concentration of 16 wt % and a pH of 10. Here, the ethoxylated emulsion thickener was a thickener represented by Formula 1 wherein each of $R_1$ and $R_2$ is a dodecyl group, and n is 500.

<Production of Dip-Molded Article>

18 wt % of calcium nitrate, 81.5 wt % of water, and 0.5 wt % of a wetting agent (Teric 320, produced by Huntsman Corporation, Australia) were mixed with each other to prepare a coagulant solution. A hand-shaped ceramic mold was dipped into the prepared coagulant solution for 10 seconds and taken out from the coagulant solution, and the hand-shaped mold was dried at 80° C. for 3 minutes, thereby applying a coagulant to the hand-shaped mold.

Thereafter, the mold to which the coagulant was applied was dipped into the obtained latex composition for dip molding for 1 minute and taken out from the latex composition, and the mold was dried at 80° C. for 3 minutes. Subsequently, the mold was dipped into water for 3 minutes to carry out leaching, the mold was dried again at 70° C. for 3 minutes, and the dried mold was subjected to cross-linking at 125° C. for 20 minutes. The cross-linked dip-molded layer was removed from the hand-shaped mold, thereby obtaining a dip-molded article having a glove shape.

Example 2

Example 2 was performed in the same manner as that of Example 1, except that the hydrophobically modified ethoxylated emulsion thickener was added in an amount of 0.1 parts by weight instead of 1 part by weight when preparing the latex composition for dip molding in Example 1.

Example 3

Example 3 was performed in the same manner as that of Example 1, except that the hydrophobically modified ethoxylated emulsion thickener was added in an amount of 6 parts by weight instead of 1 part by weight when preparing the latex composition for dip molding in Example 1.

Comparative Example 1

Comparative Example 1 was performed in the same manner as that of Example 1, except that the hydrophobically modified ethoxylated emulsion was not added when preparing the latex composition for dip molding in Example 1.

Comparative Example 2

Comparative Example 2 was performed in the same manner as that of Example 1, except that 1 part by weight of a hydrophobically modified ethoxylated urethane emulsion thickener solution being diluted with secondary distilled water at 5% and having a hydrophobic group having C14 carbon atoms was added instead of the hydrophobically modified ethoxylated emulsion thickener being diluted with the secondary distilled water at the solid content concentration of 5% and having the hydrophobic alkyl group having the C6-C13 carbon atoms when preparing the latex composition for dip molding in Example 1. Here, the ethoxylated emulsion thickener was a thickener represented by Formula 1 wherein each of $R_1$ and $R_2$ is a tetradecane group, and n is 500.

Comparative Example 3

Comparative Example 3 was performed in the same manner as that of Example 1, except that 1 part by weight of a thickener solution represented by R—$(CH_2$—$CH_2)_{10}$—$(C_2OOH)_{60}$—R (here, R is a methyl group) was added to secondary distilled water instead of the hydrophobically modified ethoxylated emulsion thickener being diluted with the secondary distilled water at the solid content concentration of 5% and having the hydrophobic alkyl group having the C6-C13 carbon atoms when preparing the latex composition for dip molding in Example 1.

Comparative Example 4

Comparative Example 4 was performed in the same manner as that of Example 1, except that 6 parts by weight of a thickener solution being diluted with secondary distilled water at 5% was added instead of the hydrophobically modified ethoxylated emulsion thickener being diluted with the secondary distilled water at the solid content concentration of 5% and having the hydrophobic alkyl group having the C6-C13 carbon atoms when preparing the latex composition for dip molding in Example 1. Here, the ethoxylated emulsion thickener was a thickener represented by Formula 1 wherein each of $R_1$ and $R_2$ is an alkyl group having 22 carbon atoms, and n is 500.

Experimental Example 1

A viscosity of each of the latex compositions for dip molding prepared in Example 3 and Comparative Examples 1 and 4 was measured. The results are shown in Table 1.

The viscosity (cPs) was measured under conditions of spindle #63 and an rpm of 60 at room temperature using a Brookfield viscometer.

TABLE 1

| Classification | Example 3 | Comparative Example 1 | Comparative Example 4 |
|---|---|---|---|
| Solid content | 44.59 | 44.79 | 44.84 |
| Viscosity | 720 | 52 | 1520 |

It was confirmed from Table 1 that a thickening increasing effect of the latex composition for dip molding of Example 3 was excellent as compared to that of Comparative Example 1.

Experimental Example 2

A syneresis property and a flow mark property of each of the latex compositions for dip molding prepared in the examples and the comparative examples and tensile properties of each of the dip-molded articles prepared in the examples and the comparative examples were measured. The results are shown in Table 2.

1) Flow Mark

The mold to which the coagulant was applied was dipped into each of the latex compositions for dip molding prepared in the examples and the comparative examples for 1 minute, the mold was pulled up in a predetermined length, the mold was dipped into the latex composition for dip molding again and then was immediately pulled up, and the presence or absence of generation and a degree of a flow mark were observed with the naked eye. The degree of the flow mark generation was divided and indicated by a ten-point method. As the number of flow marks is large, the degree of the flow mark was indicated close to 1 point, and as the number of flow marks is small, the degree of the flow mark was close to 10.

2) Syneresis

In order to confirm a syneresis time, the mold to which the coagulant was applied was dipped into each of the latex compositions for dip molding of the examples and the comparative examples for 1 minute and the mold was pulled up, and a time at which water drops were dropped during drying at a temperature of 120° C. for 4 minutes was confirmed. As the syneresis time increases, the syneresis property was excellent.

3) Tensile Strength (MPa) and Elongation (%)

Each of the dip-molded articles of the examples and the comparative examples was stretched at a cross-head speed of 500 mm/min using a universal testing machine (U.T.M.) (4466 model, Instron) according to ASTM D638, a point at which the specimen was cut was measured, and then an elongation was calculated according to the following Equations 1 and 2.

Tensile strength (MPa)=(load value (kgf))/(thickness (mm)×width (mm))    [Equation 1]

Elongation (%)=(length after stretching of specimen/initial length of specimen)×100    [Equation 2]

TABLE 2

| Classification | | Example | | | Comparative Example | | | |
|---|---|---|---|---|---|---|---|---|
| | | 1 | 2 | 3 | 1 | 2 | 3 | 4 |
| Tensile properties | Tensile strength (MPa) | 40.7 | 37.8 | 38.9 | 41.3 | 39.2 | 35.4 | 36.7 |
| | Elongation (%) | 627.3 | 632.4 | 641.2 | 663.1 | 656.3 | 606.3 | 570.3 |
| Flow mark (10 point) | | 6 | 9 | 6.5 | 5 | 5 | 1 | 1 |
| Syneresis (sec) | | >300 | >300 | >300 | 107 | >300 | 320 | 300 |

As shown in Table 2, it was confirmed that the flow mark property and the syneresis property, and the tensile properties were excellent in the latex compositions for dip molding including the thickener proposed in the present invention and the dip-molded articles in Examples 1 to 3 as compared to those in Comparative Examples 1 to 4.

Specifically, in Examples 1 to 3, the tensile properties were exhibited at the same level as those in Comparative Example 1 in which the thickener was not included and the syneresis property was significantly increased by 2 times or more compared to Comparative Example 1, and the flow mark property and the tensile properties were significantly improved as compared to those in Comparative Examples 3 and 4 in which the thickener was included, but the alkali-soluble emulsion thickener, or the hydrophobically modified ethoxylated urethane emulsion thickener having the hydrophobic alkyl group having 14 or more carbon atoms was used instead of the thickener proposed in the present invention. Meanwhile, in the case of Comparative Example 4, the viscosity exceeded 1,000 cPs, which was significantly increased, and thus, the workability was significantly deteriorated. This can also be confirmed through the significantly reduced flow mark property shown in Table 2.

The invention claimed is:

1. A latex composition for dip molding, comprising:
a carboxylic acid-modified nitrile-based copolymer latex; and
a thickener,
wherein the thickener is included in an amount of 0.005 parts by weight to 0.05 parts by weight based on 100 parts by weight of the carboxylic acid-modified nitrile-based copolymer latex,
wherein the thickener is a compound represented by the following Formula 1, $$R_1\text{—O-}[EO]_n\text{—O—}R_2 \quad \text{[Formula 1]}$$

wherein,
EO is an ethylene oxide group,
$R_1$ and $R_2$ are each independently an alkyl group, aryl group, or arylalkyl group having 6 to 13 carbon atoms, and
n is an integer of 300 to 500.

2. The latex composition of claim 1, wherein an associative part and a non-associative part are included in the thickener in amounts of 10 wt % to 25 wt % and 75 wt % to 90 wt %, respectively.

3. The latex composition of claim 1, wherein in Formula 1, $R_1$ and $R_2$ are each independently an alkyl group having 6 to 13 carbon atoms.

4. The latex composition of claim 1, wherein the carboxylic acid-modified nitrile-based copolymer latex includes a repeating unit derived from a conjugated diene monomer, a repeating unit derived from an ethylenically unsaturated nitrile monomer, and a repeating unit derived from an ethylenically unsaturated acid monomer.

5. The latex composition of claim 1, wherein a repeating unit derived from a conjugated diene monomer, a repeating unit derived from an ethylenically unsaturated nitrile monomer, and a repeating unit derived from an ethylenically unsaturated acid monomer are included in the carboxylic acid-modified nitrile-based copolymer latex in amounts of 40 wt % to 89 wt %, 10 wt % to 50 wt %, and 0.1 wt % to 10 wt %, respectively.

6. The latex composition of claim 4, wherein the conjugated diene monomer is one or more selected from the group consisting of 1,3-butadiene, 2,3-dimethyl-1,3-butadiene, 2-ethyl-1,3-butadiene, 1,3-pentadiene, and isoprene.

7. The latex composition of claim 4, wherein the ethylenically unsaturated nitrile monomer is one or more selected from the group consisting of acrylonitrile, methacrylonitrile, fumaronitrile, α-chloronitrile, and α-cyanoethylacrylonitrile.

8. The latex composition of claim 4, wherein the ethylenically unsaturated acid monomer is one or more selected from the group consisting of an ethylenically unsaturated acid carboxylic acid monomer, a polycarboxylic acid anhydride, an ethylenically unsaturated sulfonic acid monomer, and an ethylenically unsaturated polycarboxylic acid partial ester monomer.

9. The latex composition of claim 4, wherein the carboxylic acid-modified nitrile-based copolymer latex further includes an ethylenically unsaturated monomer.

10. The latex composition of claim 1, wherein the latex composition for dip molding has a viscosity of 1,000 cPs or less.

11. A method of preparing the latex composition for dip molding of claim 1, comprising mixing the carboxylic acid-modified nitrile-based copolymer latex and the thickener.

12. The method of claim 11, wherein the carboxylic acid-modified nitrile-based copolymer latex is prepared by emulsion-polymerizing a conjugated diene monomer, an ethylenically unsaturated nitrile monomer, and an ethylenically unsaturated acid monomer in the presence of an emulsifier.

13. A dip-molded article comprising a layer derived from the latex composition for dip molding of claim 1.

14. The latex composition for dip molding of claim 1, wherein the latex composition for dip molding has a viscosity of 100 to 1,000 cPs.

* * * * *